Oct. 14, 1958  J. FAISANDIER  2,855,794
AUTOMATIC CONTROL OF GEARBOXES AND THE LIKE
Filed Sept. 21, 1956  2 Sheets-Sheet 1

Inventor
J. Faisandier

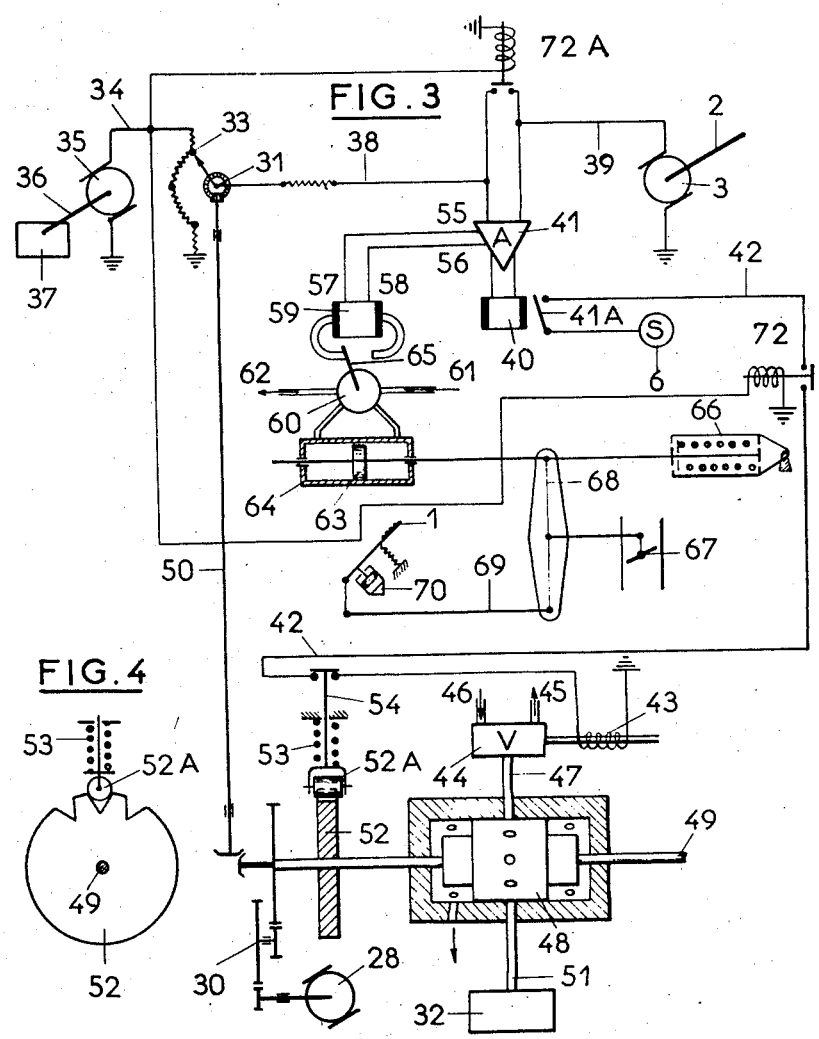

United States Patent Office 2,855,794
Patented Oct. 14, 1958

2,855,794

AUTOMATIC CONTROL OF GEARBOXES AND THE LIKE

Jacques Faisandier, Chatillon-sous-Bagneux, France

Application September 21, 1956, Serial No. 611,308

Claims priority, application France October 21, 1955

7 Claims. (Cl. 74—472)

This invention relates to automatic transmission control for continuous or discontinuous vehicular speed-changing, in particular for automobile vehicles.

One of the objects of the invention is to provide an automatic transmission control system, the automatic action of which is a function both of the speed of the vehicle and of the position of the accelerator pedal, without requiring any special action by the driver on the accelerator in order to initiate the automatic action, as is necessary in most of the present day semi-automatic controls, for example by depression of the accelerator pedal in order to step down to a lower gear combination.

Another object of the invention is to provide an automatic control of the type specified in the foregoing, which also permits of automatically or non-automatically varying the adjustment for the same position of the accelerator pedal or for the same speed, so as to obtain either a power operation or economy operation.

With these objects in view, the automatic control according to the present invention comprises means for converting into electrical magnitudes, particularly electrical voltages, the parameters which define the speed of the vehicle and the position of the accelerator pedal, means for comparing these electrical magnitudes with one another and means for controlling the torque variation as a function of the algebraic difference of these magnitudes by means of the gearbox.

Still another object of the invention is to adapt aforesaid automatic control to the control of a gearbox operating with discontinuous speed change.

A further object of the invention is to obtain, in the case of a discontinuous change-speed transmission a perfect and reliable synchronism between the driving and driven shafts at the instant when the automatic variation of the transmission ratio takes place.

A still further object of the invention is the provision of means to prevent engagement of the engine at idling speed with a control system of the type hereinbefore specified.

Other objects and many of the attendant advantages of the present invention will be more readily appreciated as the same becomes better understood by reference to the following detailed description when considered in connection with the accompanying drawings, wherein:

Figure 3 is a diagram showing the overall synchronising arrangement, and

Figure 4 is a front view of the disc 52 of Figure 3.

Figure 1:
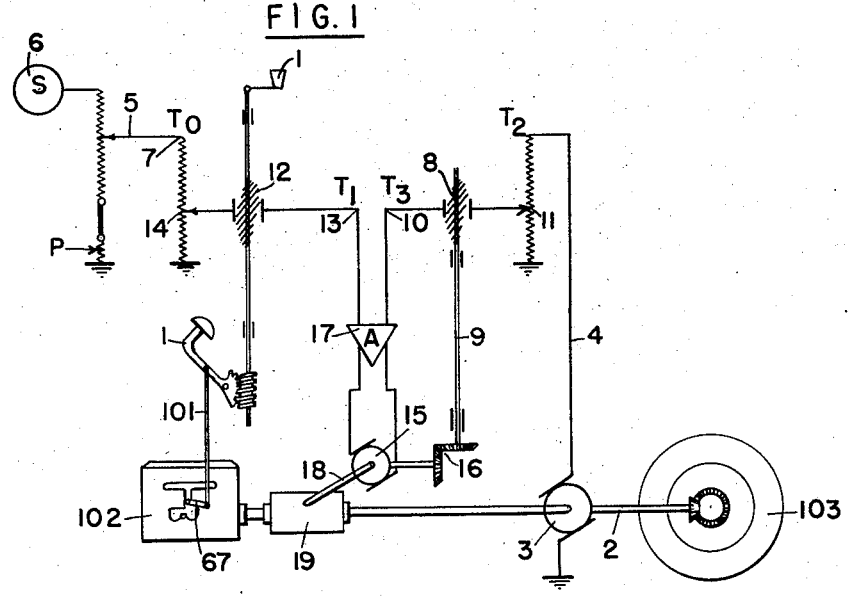
Figure 1 is a diagram showing the mechanical and electrical connections for the automatic control of a gearbox for continuous speed variation.

Referring now to the drawings wherein like reference characters indicate like parts throughout the several views, and more particularly to Fig. 1 whereon 1 designates the accelerator, coupled through a linkage 101 to the carburetor throttle valve 67 of the vehicle driving, or propelling, motor, or engine, 102 and 2 designates the output shaft whose speed of rotation is equal or proportional to the speed of the wheels 103 of the vehicle. Keyed on the shaft 2 is a dynamo 3 which transmits through the electric conductor 4 a voltage $T_2$ proportional to the speed of the vehicle. On the other hand, the circuit 5 energized by the source 6 gives at 7 a voltage $T_0$. The source 6 may be that which feeds the normal electrical circuit of the vehicle.

The circuit 4 includes a rotary potentiometer 8 which may be replaced by any potentiometer controlled by the rotative shaft 9 and gives at 10 the voltage $T_3=R_2T_2$, $R_2$ being the resistance between the point 11 at which the voltage is taken from the potentiometer 8 and ground, it being assumed that the total resistance of the potentiometer is taken as unity.

A potentiometer 12 connected in the circuit 5 gives at 13 the voltage $T_1$. The potentiometer is controlled by the movement of the accelerator 1 and has here been diagrammatically shown as a rotary potentiometer. The voltage $T_1$ is equal to $R_0T_0$, where $R_0$ designates the resistance between the point 14 at which the voltage is tapped from the potentiometer 12 and ground, the total resistance of the potentiometer being taken as unity. Since the speed of rotation of the engine, WM, may be regarded as a function of the position of the accelerator, all other factors being equal, the electrical characteristics of the potentiometers and of the dynamo may be so chosen that, with $T_1=T_3=R_2T_2$, we have $W_M=rW_R$, $W_R$ being the angular velocity of the wheels 103 and $r$ the reduction ratio at the instant considered. The problem is therefore to realise, the relationship $T_1=T_3$, which is easy to resolve by connecting these two voltages in opposition to an electric motor, which turns the shaft 9 through the mechanical transmission diagrammatically shown at 16, thus producing the variation of $R_2$ until the equality $T_1=R_2T_2$ is obtained. In practice, the voltage difference $T_1-T_2$ will be amplified by a conventional type amplifier 17 and applied to a difference voltage responsive motor 15.

The shaft 18 of the motor 15 therefore receives a rotational movement, the angular value of which is a function of the variation of the parameters defining the position of the accelerator and/or the angular velocity of the wheels.

The shaft 18 may therefore be employed to control a conventional type continuously variable gearbox, or transmission 19, that is to say, a gearbox permitting continuous variation of the transmission ratio $r$.

There may be connected in series in the circuit 5 a potentiometer or rheostat P disposed at the input of the potentiometer 12, which permits varying of the initial adjustments and of adopting a power or economy operation of the engine. The control of P may be effected manually or semi-automatically. For example, the negative pressure in the intake pipe may be used to adjust the potentiometer P in a position giving a constant power reserve, the control of the potentiometer P by means of the negative pressure being effected by means of one of the many well known devices currently employed in the automobile industry.

Figure 2:
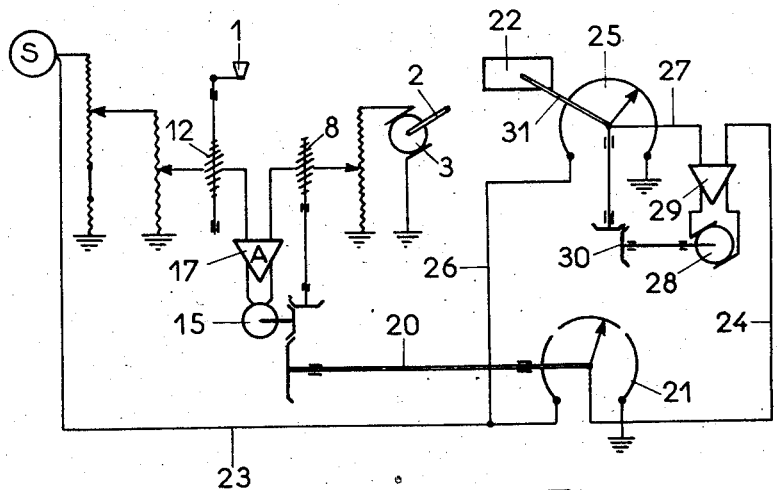
Figure 2 is the same diagram modified for the automatic control of a gearbox for discontinuous speed variation.

In Figure 2, the diagram of Figure 1 has been identically reproduced, except for the gearbox 19. On the other hand, the following elements have been added; a transmission, indicated diagrammatically at 20, transmits the movement of the motor 15 to a potentiometer 21, which comprises a number of contact studs equal to the number of reduction ratios of the discontinuously variable gearbox 22. This number is here equal to three. The said potentiometer is in a circuit 23 fed by a source which may be same as the source 6 already mentioned. By means of this potentiometer, there may be obtained at 24 three voltages $T_{10}$, $T_{11}$, $T_{12}$, into which is divided the continuous voltage range which would be given by a continuously variable potentiometer under the same conditions.

A second rotary potentiometer 25 in series in the circuit 26, also connected to the source 6, gives at 27 a voltage $T_{14}$ which it is expedient to make equal to that one of the three voltages $T_{10}$, $T_{11}$, $T_{12}$, given by the potentiometer 21 at the instant considered. For example, if this voltage is $T_{10}$, the voltages $T_{14}$ and $T_{10}$ are applied to the terminals of the motor 28, either directly or through the amplifier 29. The motor 28 controls by means of the transmission 30 the shaft 31 of the potentiometer 25, the angular position of which will vary until voltage equality is obtained.

Therefore, there will be obtained three well-defined angular positions of the shaft 31 corresponding to the voltages $T_{10}$, $T_{11}$, $T_{12}$ respectively. The shaft 31 will therefore permit control of the gearbox 22, which merely has to satisfy the condition of having discontinuous variation.

Such a device would cause jolts at the instant of the variation of the reduction ratio. As has been stated, one object of the invention is to eliminate such jolts by producing synchronism between the driving and driven shafts.

Figure 3 shows a control system like that of Figure 2 except for the absence of gearbox 22, illustration of only the shaft 31 of the potentiometer 25, the output shaft 2, and the dynamo 3 keyed on the said shaft have been shown, which is sufficient to establish the relationship between the two diagrams. In the following description, it has been assumed that the gearbox 32 is a discontinuously variable hydrokinetic gearbox but as will subsequently be seen, the invention is applicable regardless of the type of gearbox employed, provided that it gives discontinuous variations.

Therefore, the following elements have been added to the diagram of Figure 2;

Keyed on the shaft 31 is the rotary electric distributor 33 having three contacts, it again being assumed that the gearbox 32 has three reduction ratios. These three contacts correspond to the three positions which may be occupied by the potentiometer 25 of Figure 2, and they therefore each correspond to one reduction ratio. The distributor 33 is serially connected in a circuit 34 containing a dynamo 35 keyed on the shaft 36 of the motor 37.

Synchronism is obtained when a voltage $T_2$, equal to that obtained in the circuit 39, is obtained in the part 38 of the circuit 34. For comparing the two voltages, they are applied to the relay 40, preferably through the amplifier 41. The relay 40 controls the contact 41A in the blocking circuit 42. The contact 41A opens when voltage equality is obtained. The circuit 42 is assumed to be fed by the source 6. This circuit contains in series the coil 43 controlling an electromagnetic valve 44, which controls the hydraulic pressure circuit. In the absence of current, the electromagnetic distributor 44 places the duct 47 in communication with the reservoir through 45 and when it is energised it places the duct 47 in communication with the pressure 46. The hydraulic distributor 48 is here of the rotary slide valve type.

The spindle of the slide valve is designated by 49, and the movement of the shaft 31 is transmitted to the shaft 49 through the transmission system 50. In practice, these two shafts will be identical. The slide valve must occupy three well-defined angular positions corresponding to the three reduction ratios and controlling three pipes, one of which is shown at 51 and which connects to the gearbox 32. These three positions are defined by the disc 52 keyed on the shaft 49, the said disc being formed with three recesses for this purpose (Figure 4). The roller 52A subjected to the action of the spring 53 is adapted to penetrate into these recesses. In rising, the roller closes the contact 54 in series in the circuit 42. The shaft 49 (or the shaft 31 as in Figure 2) is acted on by the motor 28 through the transmission system 30.

The operation is as follows:

As soon as the disc 52, and with it the distributor 48, is moved by the motor 28 for a change of transmission ratio, the roller 52A lying at the bottom of one recess is forced upwards by the inclined side of the recess, opening contact 54, whereupon the electromagnet 43 is no longer energised and the feed of the distributor interrupted. No change of ratio can then take place, but the disc 52 and the slide valve of the distributor continue to turn under the action of a new transmission ratio, which position is finally determined by the action of the roller 52A and of its spring. The contact 54 closes as a result of the descent of the roller 52A in the new recess, the electromagnet 43 is energised and the pressure will again be available in the distributor as soon as the blocking action of the contact 41A is removed, that is to say, as soon as synchronism has been established.

The device by means of which this synchronism is automatically established in accordance with the invention will now be described.

The amplifier 41 comprises a tapping 55, 56 which is connected to the terminals 57, 58 of the polarised relay 59, which controls the distributor 60 connected at 61 to the pressure source and at 62 to the reservoir, the distributor effecting at 61 the distribution on one face or the other of the piston 63 of the jack 64, depending upon the two extreme positions which the slide valve of the distributor 60 can occupy. It has here been assumed that the said distributor is of the rotary slide valve type and there is shown at 65 the link by which it is controlled and which can occupy two extreme positions depending upon the direction of the current flowing through the polarised relay 59.

The slide valve 63 is urged into the neutral position by the spring 66, and the leakages in the cylinder 64 or passages in the piston 63 enable the latter to return into the neutral position when the link 65 itself returns into the neutral position, that is to say, when the relay 59 is deenergised upon the establishment of voltage equality across the terminals 57 and 58 in response to the establishment of synchronism. The piston 63 acts on the butterfly valve 67 of the accelerator through the floating lever 68, on one end of which it acts. The accelerator acts on the other end of lever 68 through the rod system 69.

The lever 68 therefore acts differentially on the butterfly valve 67 in order to increase or decrease the speed of rotation of the engine in accordance with the algebraic value of the voltage difference across the terminals 57, 58, that is to say, ultimately in accordance with the algebraic value of the speed difference between the shafts 2 and 36.

In order that the accelerator may not be sensitive to the action of the jack, its movement may be braked by the dashpot 70.

The blocking device which permits the change from the dead neutral position, with the engine idling, to the first speed or to the lowest transmission ratio will now be described.

It will be assumed by way of example that the change over is to take place at 500 R. P. M.

Connected in shunt to the circuit 34 are two relays 72 and 72A, which are so designed that the relay 72 closes the circuit 42 at 500 R. P. M. and above and that the relay 72A remains closed up to 600 R. P. M., so as to establish voltage equality at the input of the amplifier 41.

With $N=500$ R. P. M., 41A, 54 and 72A are closed and 72 is open. The relay 51 is at the mid-point. The butterfly valve 67 is controlled solely by the accelerator 1.

As soon as N exceeds 500 R. P. M., 72 closes, and the first speed can pass owing to the fact that the pressure then reaches the distributor 58.

From 600 R. P. M., 72A opens and the normal operating zone is entered, in which the device already described which automatically produces synchronism, can act normally.

As stated, it has been assumed for the sake of convenience that the gearbox is of the hydrokinetic type. The instant control system can readily be applied, for example, to an electrically or electromagnetically controlled gearbox. It is merely necessary to replace the distributor 48 by an electric rotary contactor of the contact type, the electromagnetic valve 44 by a switch, and the ducts 45, 46, 47, 51 by electric lines. Similarly, the distributor 60 will be replaced by a current reversing switch acting directly or indirectly on the lever 68.

The control hereinbefore described does not involve the use of a main clutch in series with the gearbox. Operation in reverse can be obtained by means of a reversing switch of any suitable type which may or may not form part of the gearbox and which is controlled by a control system of any appropriate type, which remains outside the scope of the invention.

What I claim is:

1. In combination with a variable speed transmission having a drive shaft, and being driven by a prime mover having associated therewith an accelerator, transmission control apparatus comprising, first circuit means including a first potentiometer and a potential generator responsive to the drive shaft rotational speed for generating a first potential signal correlative to said drive shaft rotational speed, second circuit means including a unidirectional potential source and a second potentiometer responsive to the degree of accelerator depression for developing a second potential signal correlative to the prime mover operational speed, and third circuit means including an electric motor for effecting adjustment of the transmission ratio of the variable speed transmission correlative to the difference between said first and second signals and for varying the effectiveness of said first potentiometer in said first circuit means in a manner to eliminate said potential difference between said first and second signals.

2. In combination with a variable speed transmission having a drive shaft, and being driven by a prime mover having associated therewith an accelerator, transmission control apparatus comprising a potential generator coupled to the drive shaft for developing a first signal having a magnitude correlative to the rotational speed of said drive shaft, a variable first impedance coupled to said generator for developing a second signal having a magnitude correlative to the instantaneous impedance effectiveness thereof, a unidirectional potential source, a variable second impedance coupled to said source for developing a third signal correlative to the operational speed of the prime mover, said second impedance being controlled by the degree of accelerator depression, an amplifier coupled to said impedances for amplifying the potential difference between said second and third signals, an electric motor coupled to the variable speed transmission and to said amplifier for effecting variation of the transmission ratio of the transmission in response to the amplified signal, said electric motor also being adapted to vary the instantaneous impedance effectiveness of said first impedance in response to said amplified signal in a manner to equalize the magnitudes of said second and third signals.

3. In combination with a discontinuously variable speed transmission having a drive shaft, and being driven by a prime mover having associated therewith an accelerator, transmission control apparatus comprising first circuit means including a first potentiometer and a potential generator responsive to the drive shaft rotational speed for generating a first potential signal correlative to said drive shaft rotational speed and the instantaneous effectiveness of said first potentiometer, second circuit means including a unidirectional potential source and a second potentiometer having an effectiveness regulated by the degree of accelerator depression for developing a second potential signal correlative to the operational speed of the prime mover, third circuit means including a first electric motor responsive to the difference between said first and second potential signals and for varying the instantaneous effectiveness of said first potentiometer in a manner to eliminate the difference between said signals, fourth circuit means including a third and fourth potentiometer serially coupled to said unidirectional potential source said third potentiometer being actuable by the response of said electric motor to the difference between said potential signals to one of a plurality of independent positions for developing a discrete third potential signal for each of said positions, the number of positions corresponding to the number of transmission ratios in the discontinuously variable speed transmission, said fourth potentiometer developing a fourth potential signal correlative to the initial effectiveness thereof, linkage means operationally intercoupling said fourth potentiometer and the variable speed transmission responsive to the variation of the effectiveness thereof for adjusting the transmission to one of the transmission ratios thereof, and fifth circuit means including a second electric motor responsive to the difference between said third and fourth potential signals for selectively varying the effectiveness of said fourth potentiometer in a manner to eliminate the difference therebetween.

4. In combination with a discontinuously variable speed transmission having a drive shaft, and being driven by a prime mover having associated therewith an accelerator, transmission control apparatus comprising first circuit means including a potentiometer and a first potential generator responsive to the prime mover operational speed for generating a first potential signal, second circuit means including a second potential generator responsive to the rotational speed of the drive shaft for generating a second potential signal, means including a slide valve distributer responsive to the potential difference between said first and second signals for selectively regulating the hydraulic pressure for the transmission, normally ineffective hydraulic pressure feed control circuit means for feeding the selectively regulated hydraulic pressure to the transmission upon being rendered effective, said feed control circuit means including a normally interrupted relay circuit closure contact adapted to being rendered uninterrupted in response to a potential difference between said first and second signals and circuit closure means responsive to the instantaneously selected transmission ratio, and electric motor means for effecting said transmission ratio selection and for correlatively varying the effectiveness of said potentiometer in a manner to equalize any potential difference between said first and second signals.

5. In a transmission control apparatus according to claim 4 and including linkage means for rendering said slide valve distributer responsive to the depression of the accelerator.

6. In a transmission control apparatus according to claim 4 wherein said potentiometer includes a plurality of independent postions corresponding to the number of transmission ratios in the discontinuously variable speed transmission, each of said positions being adapted to develop a discrete first potential signal.

7. In combination with a variable speed transmission having a drive shaft and being driven by a prime mover having associated therewith an accelerator, transmission control apparatus comprising first circuit means including a first potentiometer and a potential generator responsive to the drive shaft rotational speed for generating a first potential signal correlative to said drive shaft rotational speed, second circuit means including a uni-directional potential source and a second potentiometer responsive to the degree of accelerator depression for developing a second potential signal correlative to the prime mover operational speed, means responsive to the difference between said first and second signals for effecting the adjustment of the transmission ratio of the variable speed transmission, and feed back means for varying the effectiveness of one of said potentiometers in a manner to eliminate said potential difference between said first and second signals.

References Cited in the file of this patent

UNITED STATES PATENTS

| | | |
|---|---|---|
| 2,660,071 | Winther et al. | Nov. 24, 1953 |
| 2,719,436 | Nallinger | Oct. 4, 1955 |
| 2,732,727 | Livermore | Jan. 31, 1956 |
| 2,770,147 | Nallinger | Nov. 13, 1956 |